United States Patent [19]

Benton et al.

[11] 4,445,141

[45] Apr. 24, 1984

[54] HYBRID OPTICAL/DIGITAL IMAGE PROCESSOR

[75] Inventors: John R. Benton, Annandale, Va.; Francis J. Corbett, Weymouth; Richard A. Tuft, Bolton, both of Mass.

[73] Assignee: The United States of America as represented by the Secretary of the Army, Washington, D.C.

[21] Appl. No.: 231,563

[22] Filed: Feb. 4, 1980

[51] Int. Cl.$^3$ .......................... H04N 1/02; G02B 5/18

[52] U.S. Cl. ............................... 358/294; 350/162.12; 350/400

[58] Field of Search .................. 358/294; 350/162 SF, 350/400, 162.12, 162.13, 162.14, 162.15; 364/822

[56] References Cited

U.S. PATENT DOCUMENTS

| | | | |
|---|---|---|---|
| 3,443,858 | 5/1969 | La Russa | 350/400 |
| 3,636,512 | 1/1972 | Edwards | 350/162 |
| 3,835,249 | 4/1974 | Dattilo et al. | 358/285 |
| 3,869,697 | 3/1975 | Kawasaki | 340/146.3 |
| 3,872,293 | 3/1975 | Green | 235/181 |
| 3,891,968 | 6/1975 | McMahon | 340/146.3 |
| 4,110,004 | 8/1978 | Bocker | 350/162 |
| 4,111,519 | 9/1978 | Gillis et al. | 350/3.66 |
| 4,111,526 | 9/1978 | Joseph | 350/162 |
| 4,118,107 | 10/1978 | Parrent, Jr. et al. | 350/162 |
| 4,198,125 | 4/1980 | Tatian et al. | 350/162 |
| 4,207,370 | 6/1980 | Liu | 428/204 |

OTHER PUBLICATIONS

Iwasa-Optical Processing a Near Real-Time Coherent System Using Two Itek Prom Devices-Applied Optics-vol. 15, #6, Jun. 1976, pp. 1418-1423.

Applied Optics, vol. 11, No. 12, Dec. 1972, pp. 2752-2759.

Applied Optics, vol. 11, No. 12, Dec. 1972, pp. 2760-2767.

Optical Engineering, vol. 13, No. 3, May/Jun. 1974, ETL-0053, Aug. 9, 1976.

*Primary Examiner*—Joseph A. Orsino, Jr.
*Attorney, Agent, or Firm*—Darrell E. Hollis

[57] ABSTRACT

A two PROM coherent optical processing system under computer control provides zoom of the input object, rotation of the filter PROM relative to Fourier transform of the coherent light image, serial painting of the spatial filter on the filter PROM using a digitally controlled laser scanner, and greater operator control of the filtered image using a digital video processor and the associated computer.

32 Claims, 5 Drawing Figures

FIG. 1.
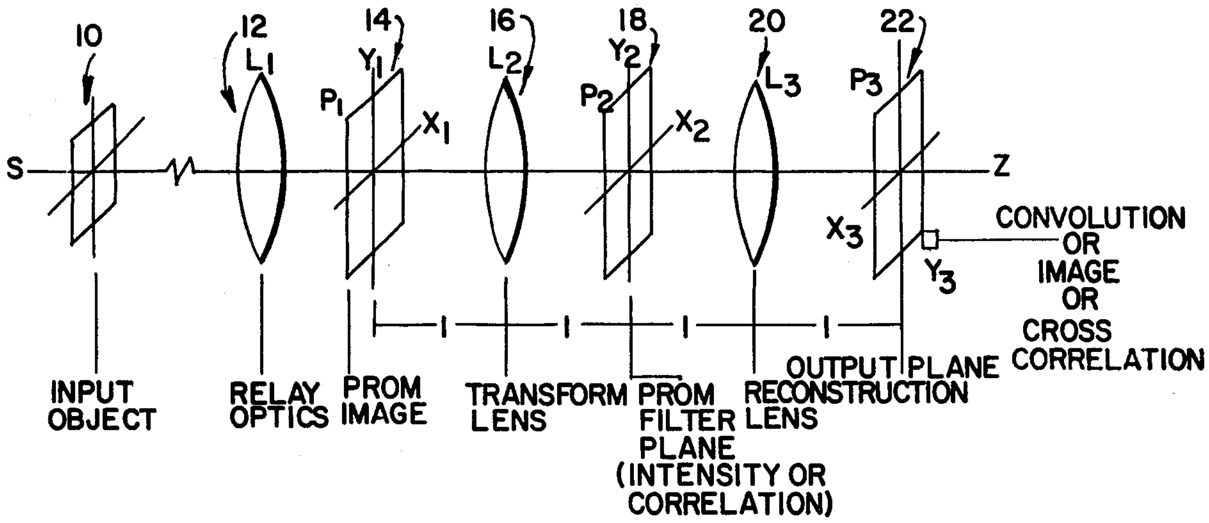
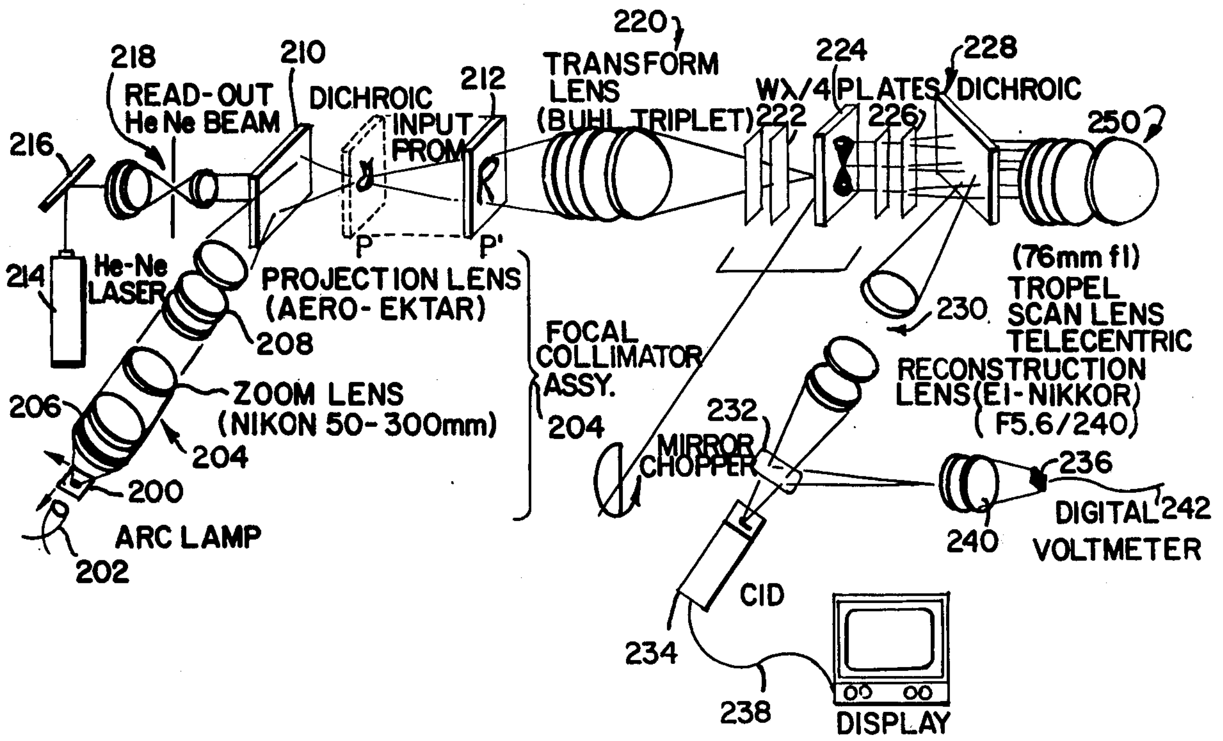
FIG. 2

HYBRID OPTICAL/DIGITAL IMAGE PROCESSOR

BACKGROUND OF THE INVENTION

The present invention relates generally to optical processing systems, and, more particularly, to an improved optical processing system having three real-time devices as well as computer control.

Coherent optical data processing has been known for a number of years. Optical systems deal with the two-dimensional blocks of data present in input objects and process this information in parallel using Fourier transformation techniques. The advent of an all solid-state image device called a PROM (Pockels Readout Optical Modulator) as described in U.S. Pat. No. 3,517,206 to D. S. Oliver has allowed a significant improvement in coherent optical processing systems.

A two PROM optical processing system has been described in the article by Sato Iwasa entitled "Optical Processing: A Near Real-Time Coherent System Using Two Itek PROM Devices", *Applied Optics*, Vol. 15, No. 6, June 1976, pp. 418–424.

OBJECTS OF THE INVENTION

It is an object of the present invention to provide an improved two PROM coherent optical data processing system under computer control.

It is another object of the present invention to provide zoom capability of the input image when the input image is non-coherent light and prior to it being provided to the input PROM.

It is a further object of the present invention to provide λ/4 plates on either side of the filter PROM to allow the spatial filter painted on the filter PROM to be rotated with respect to the Fourier transform of the coherent light image.

It is another object of the present invention to include a digital video processor to allow greater operator control of the filtered image and operation of the optical processing system.

It is a further object of the present invention to provide a digitally controlled laser scanner used to paint serially the spatial filter on the filter PROM.

These and other objects are achieved by the apparatus and method of the present invention as set forth below in the Description Of The Invention.

SUMMARY OF THE INVENTION

The present invention is an optical processor comprising means for radiating a coherent light image along an optical axis, means disposed along the optical axis for providing the Fourier transform of the coherent light image, first linear polarizing means disposed along the optical axis for linearly polarizing the Fourier transform, first λ/4 plate means disposed along the optical axis for circularly polarizing the linear polarized Fourier transform, means disposed along the optical axis for spatially filtering the circular polarized Fourier transform, second λ/4 plate means disposed along the optical axis to convert the circularly polarized light to linearly polarized light, second linear polarizer means disposed along the optical axis for analyzing (converting light from phase modulation to amplitude modulation) the filtered Fourier transform, means for reconstructing the linear polarized filtered Fourier transform to produce a filtered image, and optical sensor means for generating an output signal in accordance with the filtered image.

The means for radiating of the present invention comprises an input PROM responsive to blue light, a means for projecting a non-coherent blue light image onto the input PROM means, and means for illuminating the input PROM means with a coherent red light. The means for projecting comprises a source of non-coherent blue light, means for receiving the non-coherent blue light and for providing the non-coherent blue light image in accordance with the input object, and means for focusing the non-coherent blue light image onto the input PROM means. The means for projecting further comprises means for zooming the non-coherent blue light image.

The means for spatially filtering comprises a filter PROM means responsive to blue light, and means for scanning the filter PROM with coherent blue light to produce a spatial filter thereon. The means for scanning comprises a source of coherent blue light, polygon scanner means having a plurality of mirror facets and rotatable about a first axis for reflecting the coherent blue light in a first direction, and galvanometer scanner means having a mirror surface rotatable about a second axis for reflecting the coherent blue light from the polygon scanner means in a second direction and for providing same to the filter PROM. The means for scanning further comprises a digital data processor means under stored program control for providing a modulation signal, and acousto-optical modulator means for modulating in accordance with the modulation signal the coherent blue light provided to the polygon scanner means. The optical sensor means comprises either a television camera or a means for generating a digital signal representative of the total intensity of the filtered image.

The optical processor can further comprise a video processor means responsive to the output signal for generating a display signal, and means for producing a visible display as a function of the display signal. Further, the optical processor can further comprise digital data processing means under stored program control for producing a first signal in accordance with the output signal, video processor means responsive to the first signal for generating a display signal, and means for producing a visual display as a function of the display signal. Finally, the optical processor can further comprise digital data processor means under stored program control for generating a rotation signal, and means for rotating about the optical axis the first λ/4 plate means, the means for spatially filtering and the second λ/4 plate means in accordance with the rotation signal.

The optical processing method of the present invention comprises a step of radiating a coherent light image, providing to Fourier transform of the coherent light image, linear polarizing the Fourier transform, circularly polarizing the linear polarized Fourier transform, spatially filtering the circular polarized Fourier transform, linearly polarizing the circular polarized filtered Fourier transform, analyzing the linearly polarized Fourier transform, reconstructing the linearly polarized Fourier transform to produce a filtered image, and generating an output signal in accordance with the filtered image.

The step of spatially filtering can comprise the steps of scanning the filter PROM with coherent blue light to produce a spatial filter thereon. Next, the step of radiating the coherent light image can comprise the steps of projecting a non-coherent blue light image onto an input PROM and illuminating the input PROM with a coherent red light. This light in turn is operated on to become the circularly polarized Fourier transform passing through the filter PROM.

BRIEF DESCRIPTION OF THE DRAWINGS

FIG. 1 shows in schematic form a basic 4-f coherent optical processor of conventional design;

FIG. 2 shows in schematic form most of the major elements of the present invention;

DESCRIPTION OF THE INVENTION

Figure 3:
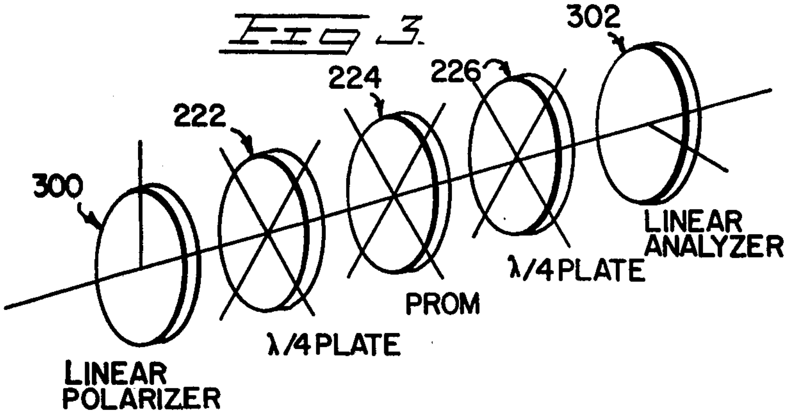
FIG. 3 illustrates the physical relationship of certain optical elements for rotating the first λ/4 plate, the filter PROM and the second λ/4 plate with respect to the optical axis to allow the spatial filter to be angularly rotated with respect to the Fourier transform.

The present invention is an improvement of the two PROM coherent optical data processor described in Iwasa, Sato, "Optical Processing: A Near Real-Time Coherent System Using Two Itek PROM Devices", *Applied Optics*, Vol. 15, No. 6, June 1976, pp. 1418–1424. The teachings of the Iwasa printed publication are incorporated by reference herein.

Referring now to FIG. 1, a basic 4-f coherent optical processor is shown. The optical axis is the z axis. The two dimensional input object, designated generally by reference numeral 10, is illuminated by a non-coherent blue light source (not shown). The non-coherent blue light image from the input object 10 is provided via relay optics, designated generally by reference numeral 12, to the first surface of an input or image PROM, designated generally by reference numeral 14. As is well-known, the input or image PROM 14 acquires the non-coherent blue light image and temporarily holds it. At the same time, a filter PROM, designated generally by reference numeral 18, acquires a spatial filter pattern by the illumination of a coherent blue light (not shown), and holds it.

When both the image and filter are stored in the respective PROMS 14 and 18, a coherent red light is directed along the optical axis from the input PROM 14. The coherent red light image from input PROM 14 is provided to a Fourier transform lens, designated generally by reference numeral 16, which provides the Fourier transform of the coherent light image. This Fourier transform is transmitted to the filter PROM 18, which filters it and provides a filtered Fourier transform. This filtered Fourier transform is reconstructed by a reconstruction lens, designated generally by reference numeral 20, which provides a filtered image at an output plane, designated generally by reference numeral 22. As is well-known, this filtered image is geometrically related to the input object, but does not include certain frequency components that have been filtered out in the optical processing.

The present invention has four inventive aspects over the system shown in schematic form in FIG. 1: (1) a digitally controlled laser scanner used to paint serially the spatial filter on the filter PROM; (2) zoom of the non-coherent blue light image prior to it being supplied to the input PROM; (3) the inclusion of a quarter wave plate on either side of the filter PROM which allows the spatial filter painted on the filter PROM to be rotated with respect to the Fourier transform of the coherent light image; and (4) the addition of a digital video processor to produce greater operator control of the filter image and the operation of the optical processing system.

An embodiment of the present invention is shown in FIGS. 2, 3, 4, and 5. Referring now to FIG. 2, an input object 200, such as a photographic negative or transparency of conventional design, for optical analyzing is illuminated by a non-coherent source of blue light, such as a mercury short arc lamp producing an output light at 436-nm line. The non-coherent blue light image is supplied by a focal collimator assembly, designated generally by reference numeral 204, to a dichroic filter 210. The focal collimator assembly 204 is made up of a zoom lens assembly 206 and a projection lens assembly 208. The zoom lens assembly 206 zooms the non-coherent blue light image from the input object 200. A suitable embodiment for the zoom lens assembly 206 is a Nikon 50–300 mm zoom lens made by Nikon of Japan. The zoomed non-coherent blue light image from the output of the zoom lens assembly 206 is provided to a projection lens 208. A suitable embodiment for the projection lens 208 is an Aero-Ektr made by Kodak.

The non-coherent blue light image from the projection lens is provided to the dichroic filter 210, which reflects this non-coherent blue light image onto the surface of an input PROM 212. The input PROM 212 temporarily holds this light image. Dichroic filter 210 and input PROM 212 are of conventional design.

A laser 214 supplies a coherent red light. A suitable form of laser 214 is a He-Ne laser. The coherent red light is reflected by a mirror 216 to a collimator lens assembly, designated generally by a reference numeral 218. The collimator assembly 218 can be of any conventional type. The collimated coherent red light from the output of the collimator assembly 218 projects the light through dichroic filter 210, to the input PROM 212.

The input PROM 212 thus produces a coherent red light image, which is provided to a Fourier transform lens assembly, designated generally by reference numeral 220. The Fourier transform lens assembly 220 can be of any suitable type, and a triplet lens made by Buhl Corporation has been found to be suitable. The Fourier transform lens assembly 220 provides a Fourier transform of the coherent red light image.

The coherent red light image is supplied to a linear polarizer, as shown only in FIG. 3, which is disposed along the optical axis. The linear polarizer 300 is of conventional design and provides a linear polarized Fourier transform of the coherent red light image. This linear polarized Fourier transform is circularly polarized by a first λ/4 plate, designated generally by reference numeral 222, as shown in FIGS. 2 and 3. The circularly polarized Fourier transform from the first λ/4 plate is supplied to a filter PROM 224. Filter PROM 224 has a spatial filter "painted" thereon by the blue light digitally controlled laser scanner shown in FIG. 4 via a flat field scan lens 250 made by Tropel Corporation shown in FIG. 2 lens 416 of FIG. 4. Filter PROM 224 can be of any conventional design. The filtered Fourier transform at the output of the filter PROM 224 is supplied to a second λ/4 plate 226, which converts the circularly polarized light to linearly polarized light. The first λ/4 plate 222 and the second λ/4 plate 226 of conventional design. A second linear polarizer 302, as shown in FIG. 3, converts the phase modulated signal produced by the PROM to an amplitude modulated signal.

The coherent red light filtered Fourier transform is reflected by a dichroic filter 228 of conventional design to a reconstruction lens assembly designated generally by reference numeral 230. The reconstruction lens assembly 230 can be of any suitable type, such as a El-Nikkor F 5.6/240 made by Nikon Corporation. The reconstruction lens assembly 230 provides the filtered image to the output plane. A mirror chopper 232 of conventional design is disposed between the reconstruction lens assembly 230 and a sensor in the form of a television camera 234 disposed at a first output plane and an optical sensor 236 disposed at a second output plane. The rotation of the mirror chopper 232 allows the filtered image to be provided at either the first or second output plane.

The television camera 234 provides a digital signal output which is representative of the filtered image. A suitable embodiment for television camera 234 is a G.E. 2500 CID camera made by the General Electric Company of New York which digitizes the filtered image. The television camera 234 can be equipped with an 8-bit parallel digital output.

At the second output plane is sensor 236. The filtered image is supplied from the mirror chopper 232 via an integrating lens 240 to sensor 236. The integrating lens 240 is of conventional design. The sensor 236 provides a digital output signal indicative of the sum of the light of the filtered image. This sum signal is provided via a line 242 to a digital voltmeter (not shown) of conventional design and to the computer 500 of FIG. 5.

As stated above, the zoom lens assembly 206 allows the non-coherent blue light image to be zoomed prior to it being provided to the input PROM 212. This zooming of the input image eliminates the problems inherent in a zoom system in a coherent system. First, in a coherent zoom system, each surface of each of the lens surfaces of the zoom assembly introduces it own coherent noise into the image to be processed. Further the D.C. spot tends to move unless each of the elements of the coherent zoom system are very carefully aligned. These two deficiencies are eliminated by the zoom system of the present invention which performs the zoom operation when the input image is still non-coherent light.

Referring again to FIGS. 2 and 3, it is shown by the respective arrows that the first λ/4 plate, the filter PROM and the second λ/4 plate can together be rotated about the optical axis. This rotation allows the image to be rotated relative to the spatial filter in order to generate a number of different filters which are different only by angular orientation. This rotation capability is indicated by PROM rotator 526 of FIG. 5, which rotator is under control by computer 500.

Figure 5:
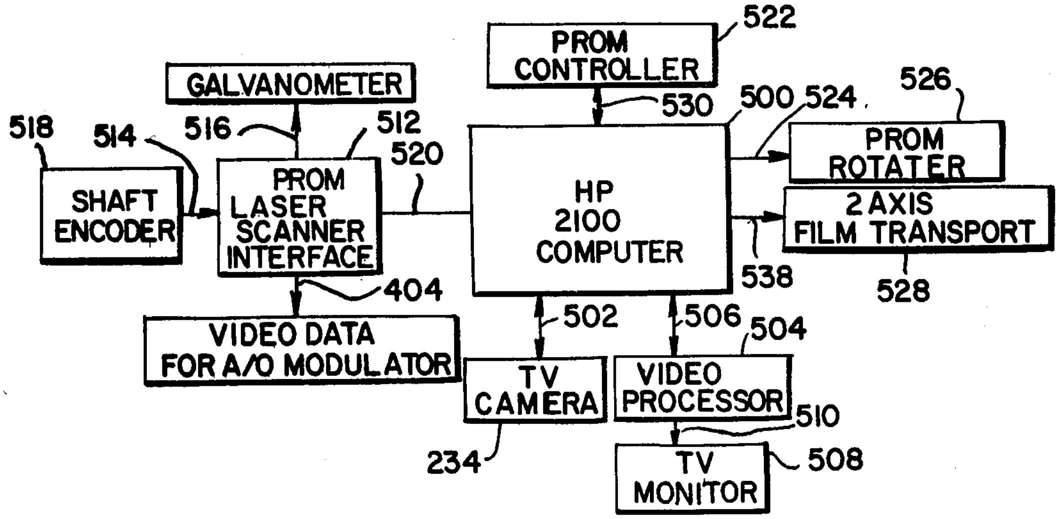
FIG. 5 shows in block diagram form the digital control/data processing portion of the present invention.

A conventional approach to rotaing the image with respect to the spatial filter is to rotate the image using a K mirror, as shown in FIG. 5 of Benton, John R., Francis Corbett, and Richard Tuft, "The Engineer Topographic Laboratories (ETL) Hybrid Optical/Digital Image Processor", Spie, Vol. 218, *Devices and Systems for Optical Signal Processing,* 1980, pp. 126–135, which is incorporated by reference herein.

The rotation of the image using a K mirror, however, introduces a number of problems. However, without the λ/4 plates of the present invention, it was impossible to achieve this desired rotation by physically rotating the filter PROM because of the washout that occurs due to the preferred axis of orientation of the filter PROM with respect to linear polarized light.

This problem was overcome by circularly polarizing the linear polarized Fourier transform. The circularly polarized Fourier transform is spatially filtered by the filter PROM, and the filtered Fourier transform is circularly polarized by the second λ4 plate. This circularly polarized filter Fourier transform is then linearly polarized by the linear analyzer 302, as shown in FIG. 3.

The following Jones matrix calculation demonstrates that the inclusion of the two properly oriented λ/4 plates 222 and 226 between the customary polarizer 300 and analyzer 302 results in an output intensity that only depends upon the filter PROM 224 and ansiotropic phase retardants δ, and not on its orientation:

$$\begin{bmatrix} \frac{E_x}{E_y} \end{bmatrix} = 2/\frac{1}{2}\begin{bmatrix} 1 & -1 \\ -1 & 1 \end{bmatrix}\begin{bmatrix} e^{-i\pi/4} & o \\ o & e^{i\pi/4} \end{bmatrix} \times$$

Electric Field Vector — Analyzer — /4 plate $$\begin{bmatrix} \cos^2\theta e^{i\delta/2} + \sin^2\theta e^{-i\delta/2} & 2i\cos\theta\sin\theta\sin\delta/2 \\ 2i\cos\theta\sin\theta\sin\delta/2 & \cos^2\theta e^{-i\delta/2} + \sin^2\theta e^{i\delta/2} \end{bmatrix}\begin{bmatrix} e^{i\pi/2} \\ 1 \end{bmatrix}$$

PROM @ Angle θ — Polarizer & /4 Plate

The output itensity is given by $$I = E_xE_x^* + E_yE_y =$$

$$\frac{\sin^2\delta/2}{2}[\cos^2 2\theta + \sin^2 2\theta + \cos^2 2\theta + \sin^2 2\theta] = \sin^2\delta/2$$

independent of θ.

Referring now to FIG. 5, the digital control/data processing subsystem for controlling the optical system of the present invention is shown. A digital data processor 500 under stored program control or computer is connected via a bidirectional parallel bus 502 to the television camera 234. A suitable form for the processor 500 is a HP2108 computer made by the Hewlett-Packard Corporation of Palo Alto, Calif.

A video processor 504 is connected via a bidirectional parallel bus 520 to the computer 500. A suitable form for the video processor is made by Lexidata Corporation, which contains a 512×640×12 bit refresh memory that generates the R/G/B signals for a color television monitor 508 connected to the video processor 504 by a bus 510. The video processor 504 can store four filtered images from the CID camera 234. The operator is able to command the processor to display the images in sequence, and thereby emphasize the effects of different optical filters. Pesudo-color can be used to emphasize the subtle differences produced by varying the spatial filter. The operator can then try new optical filters and iteratively develop optimum methods of detecting patterns.

It is anticipated that digital pattern recognition programs can be developed to be used with the video processor 504 in conjunction with the computer 500 in order to achieve better data analysis.

Figure 4:
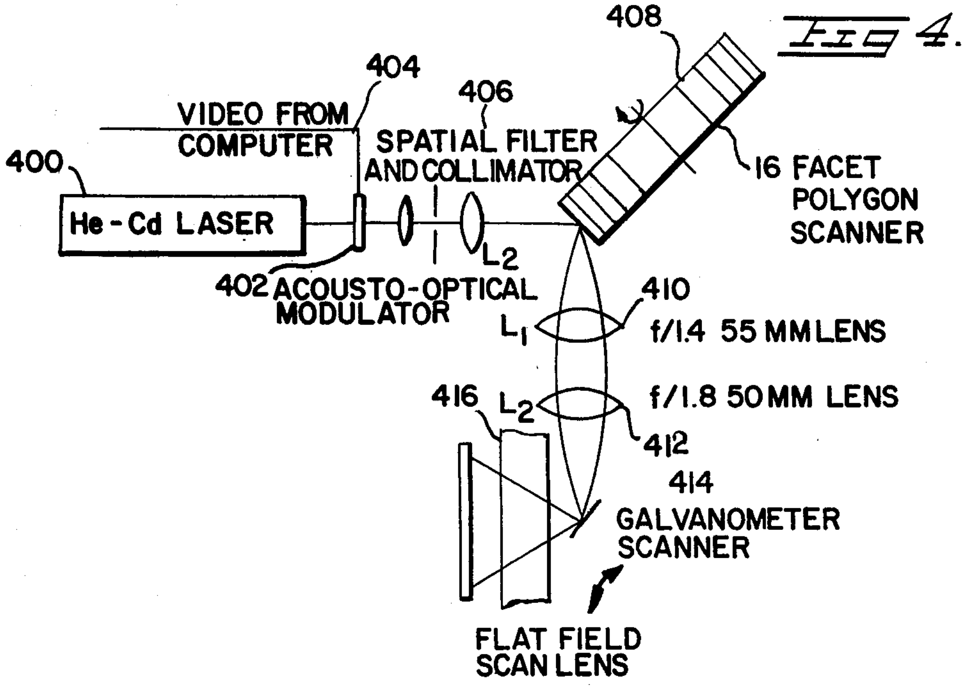
FIG. 4 shows the optics of the laser scanner.

Referring now to FIGS. 2, 4 and 5, the digitally controlled laser scanner used to paint serially the spatial filter on the filter PROM 224 is now described.

The scanner paints the spatial filter image onto the filter PROM 224 in a serial fashion, pixel by pixel. The key constraints in the overall design of the scanner include raster size, number of pixels, bits per pixel, raster writing speed and geometric accuracy. The raster size is determined from the useful area of the filter PROM 224. In the embodiment, for a 13-millimeter square raster, a minimum resolution of about 500×500 pixels was selected. This was a compromise between the conflicting requirements of image quality and raster writing speed. The corresponding pixel diameter is 25 micrometers. The design goal was for a raster writing speed of less than one second.

Computer 500 has stored programs for generating the various spatial filters that are painted onto the filter PROM 224 by the scanner. The scanner shown in FIG. 4 is controlled by the PROM laser scanner interface 512 of FIG. 5, which is described below.

Turning now to FIG. 4, the optical configuration of the laser scanner is shown. A source of blue coherent light 400 is provided. A suitable embodiment of this source is a 15 mw He-Cd laser operating at 441.6 nm line. An acousto-optical modulator 402 is disposed in the optical axis of the source 400 for digitally controlling its coherent light output. The acousto-optical modulator of conventional design is controlled by the PROM laser scanner interface 512 via a video data line 404. A spatial filter and collimator assembly 406 is disposed on the optical axis on the other side of the acousto-optical modulator 404 from the source 400. The spatial filter and collimator are used to expand and collimate the laser beam that has been modulated by the acousto-optical modulator 402 under control of the PROM laser scanner interface 512. A polygon scanner, designated generally by reference numeral 408, is rotated at a constant speed by a scanner motor (not shown) along a first axis of rotation. Any suitable number of facets can be employed on the polygon scanner 408. One embodiment that has been employed has 16 facets, which act to deflect an incident laser beam through a total angle of 45°, resulting in a 33% duty cycle. The polygon scanner 408 is of conventional design. The polygon scanner 408 acts to reflect the coherent blue light from the source 400 in a first direction.

The reflected blue light from the polygon scanner 408 is supplied to a telescope made up of lenses 410 and 412. Lenses 410 and 412 are of conventional design. A suitable embodiment for lens 412 is a f/1.4 55 mm lens and a suitable embodiment for lens 412 is a f/1.8 50 mm lens. The lenses 410 and 412 act to image the reflected coherent blue light from the polygon scanner 408 onto the mirror surface of a galvanometer scanner 414. The galvanometer scanner is rotatable about a second axis for reflecting the coherent blue light from the polygon scanner 408 in a second direction. The suitable embodiment for the galvanometer scanner 414 is a General Scanning No. 300-PDT Galvanometer with temperature control made by General Scanning Corporation. As can be appreciated, the galvanometer 414 has a system response which is sufficiently fast to control the slow axis scan. The computer 500 can be programmed to correct for non-linearities in this scan.

The coherent blue light from the galvanometer scanner 414 is transmitted by a flat field scan lens 416 to the filter PROM 224 shown in FIG. 2. The entrance pupil of the flat field scan lens 416 is 25 mm in front of the physical lens. This lens is positioned such that the entrance pupil coincides with the polygon mirror surface. The filter PROM 224 is positioned in the back focal plane of the scan lens 414. Thus it is seen that the optical configuration shown in FIG. 4 can produce the desired serial scanning of the filter PROM 224, so that the filter PROM can act as a spatial light modulator or filter.

A shaft encoder 518 (FIG. 5) is connected to the scanner motor (not shown) to provide shaft encoder signals indicative of the angular position of the polygon scanner 408. These shaft encoder signals are provided via a bus 514 to the PROM laser scanner interface 512, as shown in FIG. 5. Further, a galvanometer control signal is provided by the PROM laser scanner interface 512 via a bus 516 to the galvanometer scanner 414 to control its angular position about its axis of rotation.

The operation of the laser scanner is now described. The PROM laser scanner interface 512 is designed to have the scanner motor (not shown) run at a constant speed, as stated above. The shaft encoder signals from bus 514 are used to control the timing of interface 512 disposed between the laser scanner and the computer 500. This approach requires that the computer 500 always be able to respond within the required time interval. Thus, the motor speed must not exceed the rate at which data can be transferred by the computer 500 via bus 520 to interface 512. The shaft encoder 518 provides a shaft encoder signal, as stated above, which, for example, includes a zero reference signal plus on 8192 count per revolution signal. These two shaft encoder signals are used to generate the start of scan signal and the pixel strobe signals. The video data are strobed 12 bits at a time alternately into parallel input shift registers. In the binary mode, data is shifted out serially to form the video signal on line 404, while in the six bit gray shade mode, the lower order six bits are strobed from the parallel output of the shift register into a digital-to-analog converter. Subsequently, in this 6-bit gray shade mode, the higher-order 6-bits are strobed to the digital-to-analog converter.

As stated above, computer programs are stored in computer 500 in order to generate desired spatial filter patterns. Because spatial filters are frequently binary, only one bit per pixel will be required. However, in the event that there is not sufficient computer memory space, compaction of the data can be achieved by considering the nature of the typical binary filter. A binary filter will usually be a two-dimensional low pass, band-pass or high pass filter with a limited number of black/white transitions on a given scale line. Therefore, the video can be stored in a run-length code format with only the number of sequential ones or zeros stored in memory. For example 9 transitions per line would require only 5,000 words of memory with a 16-bit run-length code for each segment.

Referring again to FIG. 5, it is seen that the computer 500 is in bidirectional communication via bus 530 with a PROM controller 522. The PROM controller 522 controls the electrical field applied to each of the two PROMs in the system. This control allows the image or spatial filter painted on each PROM to be changed from positive to negative, or to change the contrast of some. This allows baseline subtraction to be performed so as to reduce the brightness of the D.C. spot by a large factor by going halfway between the full positive and full negative range of each PROM. Thus, the modulation of the PROMs that can be achieved by the PROM controller 522 results in improved processing by the present invention.

In addition, computer 500 controls via a bus 524 the PROM rotator 526 which is used to rotate physically the filter PROM 224, the first λ/4 plate 222 and the second λ/4 plate 226 discussed above.

Finally, the computer 500 controls via a bus 538 a two axis film transport mechanism 528, which is used to move the input object 200 with respect to the arc lamp 202 so that a large input object can be sequentially analyzed by the system of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. An optical processor comprising:
- a. means for radiating a coherent light image along an optical axis including
  - (1) input PROM means responsive to light,
  - (2) means for projecting a non-coherent light image onto said input PROM means; and
  - (3) means for illuminating said input PROM means with a coherent light;
- b. means disposed along said optical axis for providing the Four ier transform of said coherent light image;
- c. first linear polarizer means disposed along said optical axis for linear polarizing said Fourier transform;
- d. first λ/4 plate means disposed along said optical axis for circular polarizing the linear polarized Fourier transform;
- e. means disposed along said optical axis for spatially filtering said circular polarized Fourier transform;
- f. second λ/4 plate means disposed along said optical axis for converting said circular polarized filtered Fourier transform back to linear polarized form;
- g. second linear polarizer means disposed along said optical axis for analyzing said linearly polarized filtered Fourier transform;
- h. means for reconstructing said linear polarized filtered Fourier transform to produce a filtered image;
- i. optical sensor means for generating an output signal in accordance with said filtered image; and
- j. means for rotating about said optical axis said first λ/4 plate means, said means for spatially filtering and said second λ/4 plate means.

2. The optical processor as recited in claim 1, wherein said means for illuminating comprises:
- a. a source of coherent red light; and
- b. means for collimating said coherent red light and for supplying same to said input PROM means.

3. The optical processor as recited in claim 1, wherein said means for reconstructing comprises a reconstruction lens.

4. The optical processor as recited in claim 1, wherein said optical sensor means comprises means for generating a digital signal representative of the total intensity of the filtered image.

5. The optical processor as recited in claim 1, further comprising:
- a. digital data processor means under stored program control for generating a rotation signal; and
- b. said rotation signal being coupled to said rotating means for controlling the same.

6. The optical processor as recited in claim 1, wherein said means for radiating further comprises means, disposed between said input PROM means and said means for projecting and said means for illuminating, for reflecting said non-coherent light image onto said input PROM means and for transmitting said coherent light to said input PROM means.

7. The optical processor as recited in claim 6, wherein said means for reflecting and for transmitting comprises a dichroic filter.

8. The optical processor as recited in claim 1, wherein said means for projecting comprises:
- a. source of non-coherent blue light;
- b. means for receiving said non-coherent blue light and for providing said non-coherent blue light image in accordance with an input object; and
- c. means for focusing said non-coherent blue light image onto said input PROM means.

9. The optical processor as recited in claim 8, wherein said means for focusing comprises a projection lens.

10. The optical processor as recited in claim 8, wherein said input object is a transparency.

11. The optical processor as recited in claim 8, wherein said means for projecting further comprises means, disposed between said means for providing said non-coherent blue light image and said means for focusing, for zooming said non-coherent blue light image.

12. The optical processor as recited in claim 11, wherein said means for zooming comprises a zoom lens assembly.

13. The optical processor as recited in claim 8, wherein said input object is a photographic negative.

14. The optical processor as recited in claim 13, wherein said source of coherent light comprises a He-Ne laser.

15. The optical processor as recited in claim 1, wherein said means for providing the Fourier transform of said coherent light image comprises a transform lens.

16. The optical processor as recited in claim 15, wherein said transform lens comprises a triplet lens.

17. The optical processor as recited in claim 1, wherein said means for spatially filtering comprises:
- a. filter PROM means responsive to blue light; and
- b. means for scanning said filter PROM with coherent blue light to produce a spatial filter thereon.

18. The optical processor means as recited in claim 17, wherein said means for scanning comprises:
- a. source of coherent blue light;
- b. polygon scanner means having a plurality of mirror facets and rotatable about a first axis for reflecting said coherent blue light in a first direction; and
- c. galvanometer scanner means having a mirror surface rotatable about a second axis for reflecting said coherent blue light from said polygon scanner means in a second direction and for providing same to said filter PROM.

19. The optical processor as recited in claim 18, wherein said means for scanning further comprises:
- a. digital data processor means under stored program control for providing a modulation signal; and
- b. acousto-optical modulator means for modulating in accordance with said modulation signal said coherent blue light provided to said polygon scanner means.

20. The optical processor as recited in claim 19, wherein said means for scanning further comprises:
- a. substantially constant speed motor for rotating said polygon scanner means about said first axis; and
- b. shaft encoder means associated with said motor for generating a shaft encoder signal indicative of the angular position of said polygon scanner means.

21. The optical processor as recited in claim 20, wherein said ditital data processor means comprises interface means responsive to said shaft encoder signal.

22. The optical processor as recited in claim 19, wherein said ditital data processor means comprises:

interface means for generating a galvanometer position signal, and further comprising means for rotating said mirror surface of said galvanometer scanner means in accordance with said galvnometer position signal.

23. The optical processor as recited in claim 17, wherein said means for scanning comprises means for serially scanning said filter PROM with coherent blue light.

24. The optical processor as recited in claim 23, wherein said source of coherent blue light is a He-Cd laser.

25. The optical processor as recited in claim 23, wherein said means for scanning further comprises:

a. means for spatially filtering and collimating said coherent blue light and for providing same to said polygon scanner means;
b. telescope means for focusing said coherent blue light from said polygon scanner means onto said mirror surface of said galvanometer scanner means; and
c. a flat field scan lens for transmitting said coherent blue light from said galvanometer scanner means to said filter PROM means.

26. The optical processor as recited in claim 17, wherein said means for spatially filtering further comprises means for transmitting to said filter PROM means said coherent blue light from said means for scanning, and for reflecting to said means for reconstructing said linear polarized filtered Fourier transform.

27. The optical processor as recited in claim 26, wherein said means for transmitting and reflecting comprises a dichroic filter.

28. The optical processor as recited in claim 1, wherein said optical sensor means comprises a television camera.

29. The optical processor as recited in claim 28, further comprising means responsive to said output signal for displaying visually said filtered image.

30. The optical processor as recited in claim 29, wherein said means for displaying visually comprises a television monitor.

31. The optical processor as recited in claim 28, further comprising:

a. video processor means responsive to said output signal for generating a display signal; and
b. means for producing a visual display as a function of said display signal.

32. The optical processor as recited in claim 28, further comprising:

a. digital data processing means under stored program control for producing a first signal in accordance with said output signal;
b. video processor means responsive to said first signal for generating a display signal; and
c. means for producing a visual display as a function of said display signal.

* * * * *